United States Patent
Reubeuze

(10) Patent No.: US 7,032,973 B2
(45) Date of Patent: Apr. 25, 2006

(54) SYSTEM FOR LOCKING A FIRST ELEMENT WITH A SECOND ELEMENT, AND A SEAT FITTED WITH SUCH A LOCKING SYSTEM

(75) Inventor: Yann Reubeuze, Landigou (FR)

(73) Assignee: Faurecia Sieges d'Automobile, Nanterre (FR)

( * ) Notice: Subject to any disclaimer, the term of this patent is extended or adjusted under 35 U.S.C. 154(b) by 0 days.

(21) Appl. No.: 10/873,700

(22) Filed: Jun. 22, 2004

(65) Prior Publication Data
US 2004/0262972 A1 Dec. 30, 2004

(51) Int. Cl.
*B60N 1/02* (2006.01)
*E05C 3/24* (2006.01)

(52) U.S. Cl. .................. 297/378.13; 292/95; 292/121; 292/219

(58) Field of Classification Search ........... 297/278.12, 297/278.13; 296/65.16; 292/44, 45, 53, 292/95, 109, 121, 122, 127, 219, 227, DIG. 37
See application file for complete search history.

(56) References Cited

U.S. PATENT DOCUMENTS

| | | | | |
|---|---|---|---|---|
| 4,636,005 A | * | 1/1987 | Bolz et al. ............ | 297/378.13 |
| 4,904,003 A | * | 2/1990 | Yamazaki et al. ..... | 297/378.13 |
| 5,383,699 A | * | 1/1995 | Woziekonski et al. . | 297/378.12 |
| 5,562,325 A | * | 10/1996 | Moberg ................. | 297/378.13 |
| 5,664,839 A | * | 9/1997 | Pedronno et al. ...... | 297/378.13 |
| 5,700,056 A | * | 12/1997 | Bernard ................. | 297/378.13 |
| 5,713,634 A | * | 2/1998 | Koike ................... | 297/378.13 |
| 5,743,593 A | * | 4/1998 | Vogt ..................... | 297/378.12 |
| 5,762,401 A | * | 6/1998 | Bernard ................. | 297/378.12 |
| 5,855,414 A | * | 1/1999 | Daniel et al. .......... | 297/378.13 |
| 6,132,000 A | * | 10/2000 | Tanaka .................. | 297/378.13 |
| 6,312,055 B1 | * | 11/2001 | Uematsu ................ | 297/378.13 |
| 6,547,302 B1 | * | 4/2003 | Rubio et al. ........... | 297/378.13 |

FOREIGN PATENT DOCUMENTS

| | | |
|---|---|---|
| DE | 8 811 740 U | 11/1988 |
| DE | 4324691 A1 * | 1/1995 |
| FR | 2 757 114 | 6/1998 |
| FR | 2 760 778 | 9/1998 |
| GB | 2 217 769 | 11/1989 |

* cited by examiner

Primary Examiner—Peter M. Cuomo
Assistant Examiner—Stephen D'Adamo
(74) Attorney, Agent, or Firm—McCracken & Frank LLP

(57) ABSTRACT

A system for locking a first element with a second element, the system including a control member fitted on the first element and suitable for being actuated by a user in a direction that is substantially rectilinear and perpendicular to a pivot pin of a latch designed to co-operate with an anchor member fixed on the second element. The control member further includes a housing for receiving a finger of the latch while the latch is in the locked position so as to prevent the latch from pivoting about the pivot pin.

8 Claims, 5 Drawing Sheets

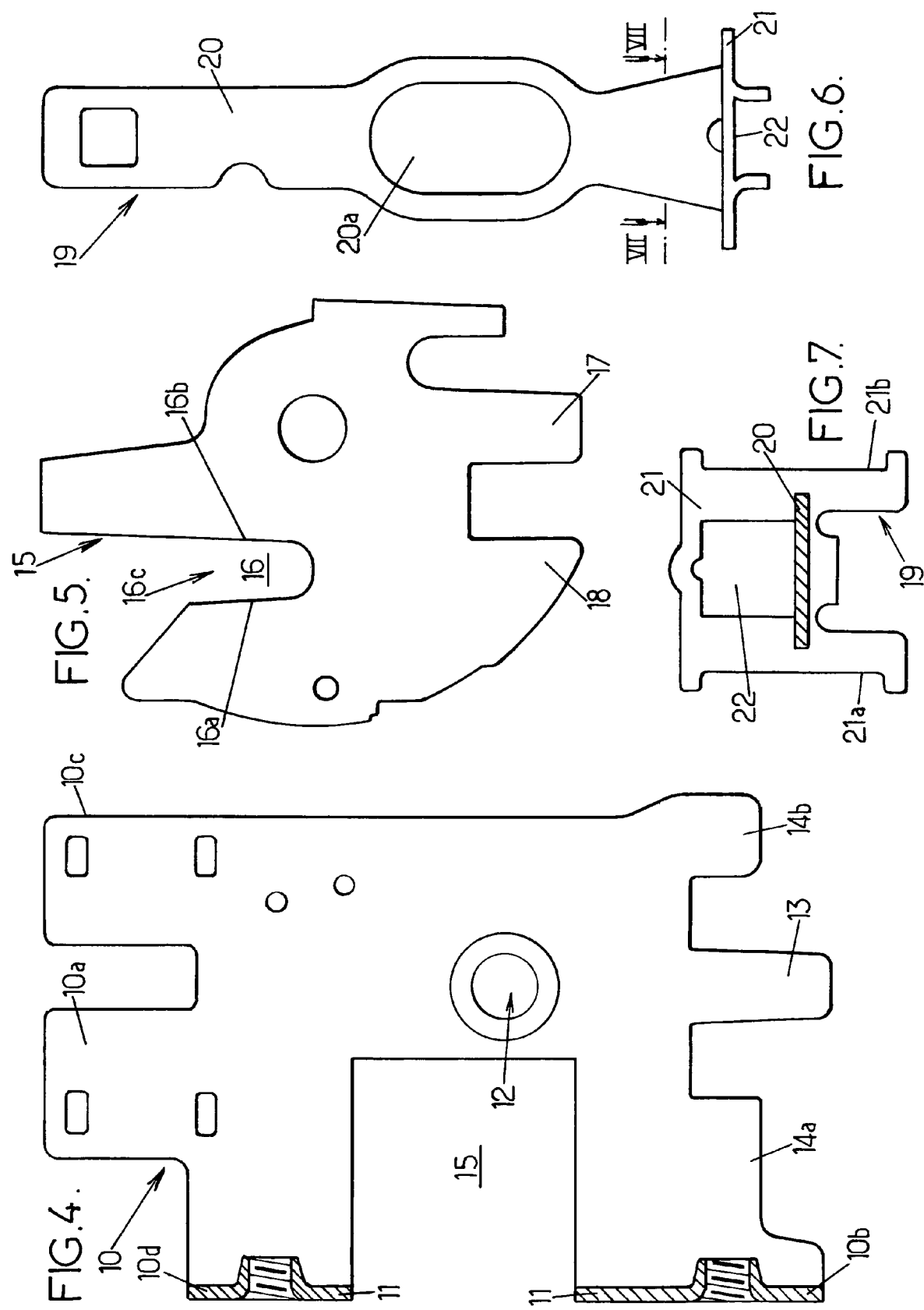

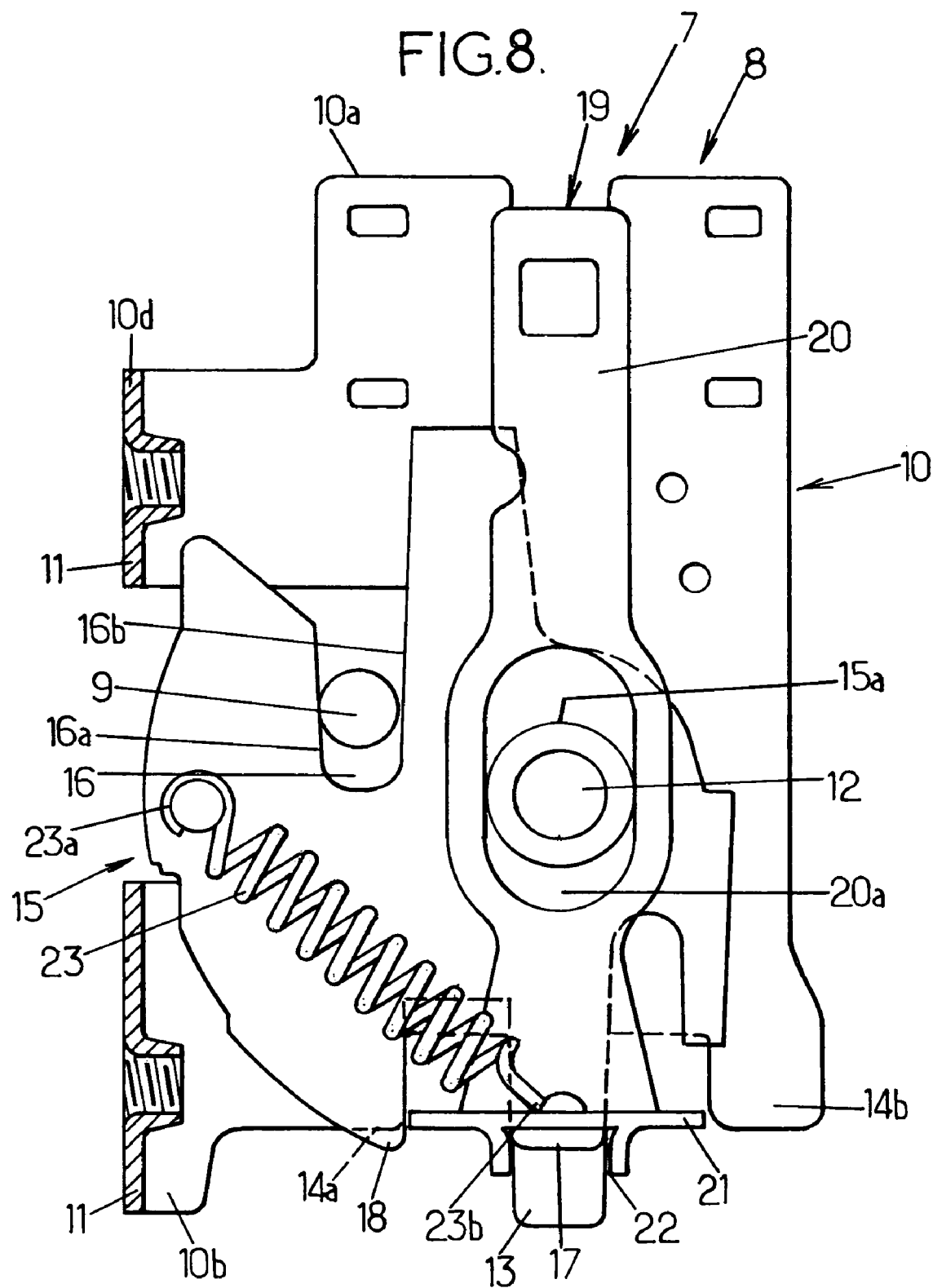

SYSTEM FOR LOCKING A FIRST ELEMENT WITH A SECOND ELEMENT, AND A SEAT FITTED WITH SUCH A LOCKING SYSTEM

FIELD OF THE INVENTION

The present invention relates to a system for locking a first element with a second element, and to a vehicle seat fitted with such a locking system.

More particularly, the invention relates to a locking system comprising:
- at least one plate fitted in fixed manner on the first element;
- a latch including a notch for co-operating with an anchor member of the second element, the latch being pivotally mounted on the plate about a pivot pin to pivot between a locked position in which the notch co-operates with the anchor member and an unlocked position; and
- a control member mounted to move on the plate between firstly a locking position in which the control member prevents the latch from pivoting while it is in the locked position so as to lock the first element with the second element, and secondly an unlocking position in which said control member allows the latch to pivot about the pivot pin towards the unlocked position.

BACKGROUND OF THE INVENTION

Such a locking system is known in particular from document FR-A-2 760 778. In that locking system, the control member is directly mounted to pivot on the plate about a second pivot pin distinct from the pivot pin of the latch. The control element thus begins by pivoting about the second pivot pin away from its locking position towards its unlocking position in such a manner as subsequently to allow the latch to pivot about its pivot pin away from its locked position towards its unlocked position. The presence of two pivot pins, and thus the presence of relative pivoting between the control member and the latch, requires manufacturing and assembly tolerances for the latch and the control member on the plate which are relatively constricting if it is desired to avoid the locking system becoming jammed in an intermediate position due to the latch accidentally being put into abutment with the control member in an intermediate position during their pivoting.

OBJECTS AND SUMMARY OF THE INVENTION

The present invention seeks in particular to mitigate the above-mentioned drawbacks.

To this end, the invention provides a locking system wherein the control member is mounted to move on the plate in a direction that is substantially rectilinear and perpendicular to the pivot pin of the latch and wherein the control member includes a housing in which a finger of the latch is designed to be held captive while said latch is in the locked position, thereby preventing the latch from pivoting about the pivot pin, the finger of the latch being designed to be disengaged from the housing of the control member when the control member is moved towards the unlocking position.

By means of these dispositions, since the control member is designed to be moved in a rectilinear direction perpendicularly to the pivot pin of the latch, the control member and the latch need no longer present manufacturing and assembly tolerances that are so constricting, thereby reducing the cost of manufacturing the locking system as a whole. In addition, the presence of the housing formed in the control member and in which the latch is received when in the locked position, makes it possible to prevent pivoting of said latch effectively in both pivot directions about the pivot pin.

In preferred embodiments of the invention, recourse may optionally also be had to one or more of the following dispositions:
- the control member presents a window of oblong shape in which the pivot pin of the latch is received, said pivot pin constituting a pin for guiding rectilinear displacement of the control member;
- the plate further comprises guide means for guiding the rectilinear displacement of the control member between its locking and unlocking positions;
- the plate includes a finger which remains received inside the housing made in the control member so as to prevent the control member from pivoting while it is being displaced in the rectilinear direction between its locking and unlocking positions;
- the control member comprises a first flange substantially parallel to the plate and a second flange perpendicular to the first flange, the housing of the control member being made in the second flange;
- the second flange of the control member is defined in a longitudinal direction perpendicular to the rectilinear direction, by a first edge for coming into abutment contact against a first projecting portion of the plate during a predetermined impact, and by a second edge designed to come into abutment contact against a second projecting portion of the plate during a predetermined impact in the opposite direction;
- the notch of the latch presents an edge which extends beyond the opening of said notch to co-operate by contact with the anchor member of the second element, causing said latch to pivot from its unlocked position towards its locked position, while the first and second elements are being moved towards each other; and
- the control member and the latch are connected together by an elastically deformable element adapted firstly to bring the control member into its locking position when the latch is in its locked position in which the control member prevents the latch from pivoting, and secondly to bring the latch into the unlocked position and hold it there when the latch is no longer co-operating with the anchor member.

Furthermore, the invention also provides a motor vehicle seat including a seat back designed to be pivotally mounted relative to the structure of the vehicle between a folded-down position and a raised, in-use position in which said seat back is locked to the fixed portion of the vehicle by means of a locking system as defined above.

BRIEF DESCRIPTION OF THE DRAWINGS

Other characteristics and advantages of the invention appear from the following description of an embodiment thereof, given by way of non-limiting example and with reference to the accompanying drawings.

In the drawings:

FIG. 4 is an elevation view of a plate forming a part of the locking system in accordance with the invention;

FIG. 5 is an elevation view of a latch forming part of the locking system;

FIG. 6 is an elevation view of a control member forming part of the locking system;

FIG. 7 is a section view on line VII—VII of the control member shown in FIG. 6;

FIG. 8 is an elevation view of the locking system in accordance with the invention, in an intermediate position.

MORE DETAILED DESCRIPTION

In the various figures, the same references designate elements that are identical or similar.

Figure 1:
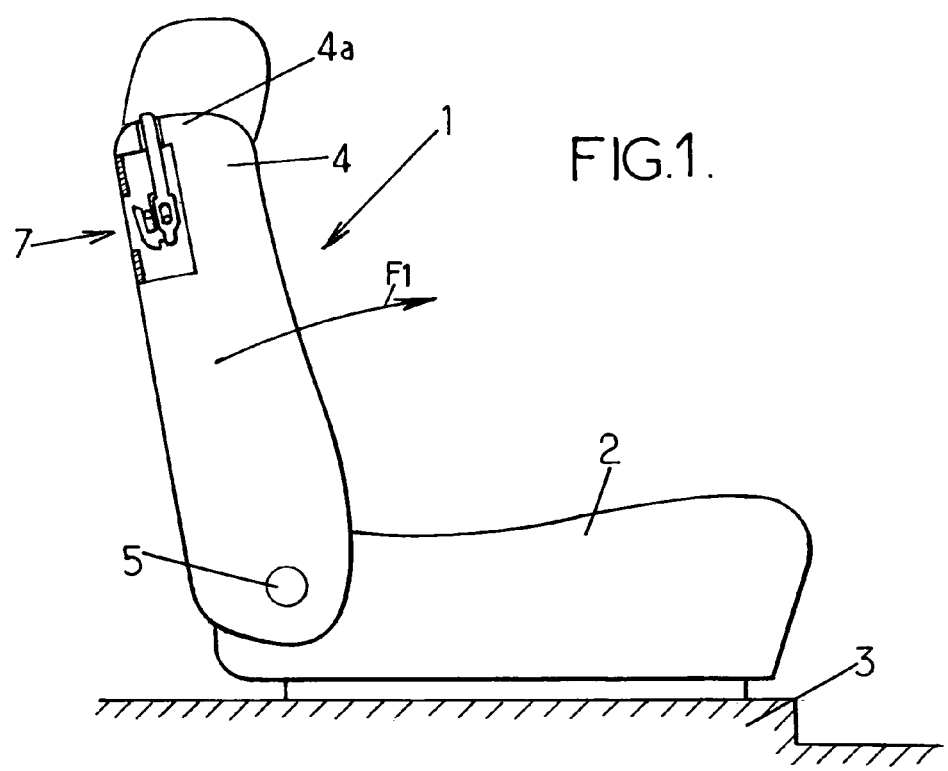
FIG. 1 is a diagrammatic side elevation view, partially in section, of a vehicle back seat fitted with a locking system in accordance with the invention.

FIG. 1 shows a motor vehicle seat, and in particular a back seat, which comprises firstly a seat proper 2 fixed to the structure or floor 3 of the vehicle, and secondly a seat back 4 mounted to pivot relative to the seat proper 2 and thus relative to the structure 3 of the vehicle about a pivot axis 5. The seat back 4 is mounted to pivot about the pivot axis 5 between a raised, in-use position as shown in FIG. 1 in which the seat back 4 extends substantially vertically, and a folded-down position, e.g. folded down forwards along arrow F1, in which the seat back 4 extends substantially horizontally in parallel with the seat proper 2.

Figure 2:
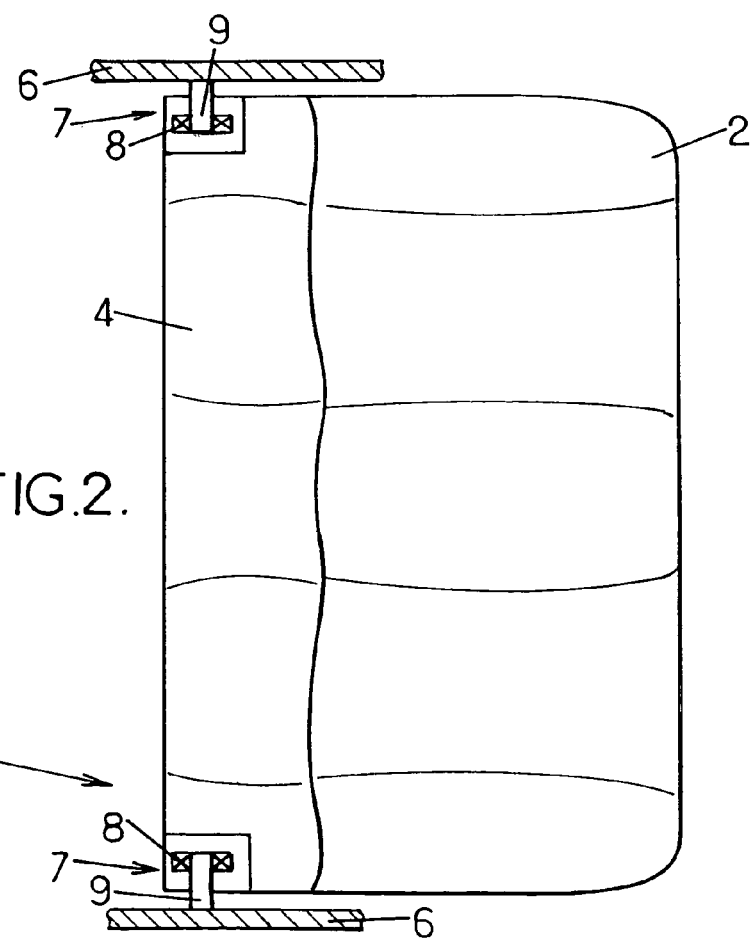
FIG. 2 is a plan view of the back seat shown in FIG. 1.

In this raised, in-use position, the top portion 4a of the seat back 4 is locked to the structure or bodywork 6 of the vehicle, as shown in FIG. 2, by means of two locking systems 7 disposed transversely on either side of the seat back 4 and designed to connect the rigid structure of the seat back 4 to the structure 6 of the vehicle. These locking systems 7 serve mainly to retain the seat back 4 reliably relative to the structure 6 of the vehicle when said seat back is in its raised, in-use position, while also enabling each locking system 7 to be unlocked simply so as to allow a user to move the seat back 4 into its folded-down position.

In the example shown in FIG. 2, each locking system 7 comprises a locking device 8 directly fitted to the rigid structure (not shown) of the seat back 4, and an anchor member 9 directly fixed to the bodywork 6 of the motor vehicle. Naturally, it would also be possible for the locking device 8 to be fitted to the bodywork 6 of the vehicle while the anchor member 9 is directly fixed to the rigid structure of the back 4 of the seat 1.

Figure 3:
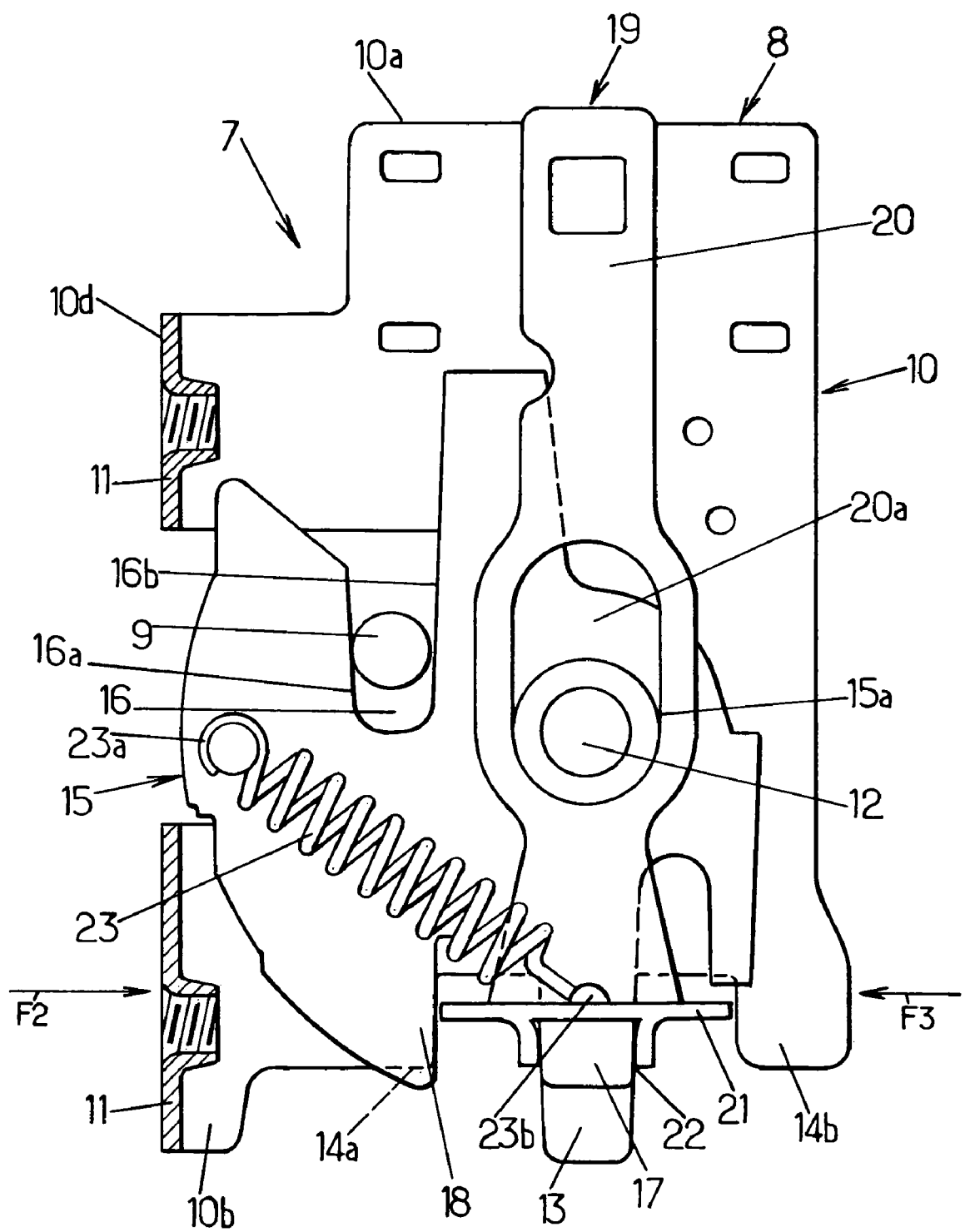
FIG. 3 is an elevation view of the locking system in accordance with the invention in the locked position.

FIG. 3 shows one of the locking systems 7 in a locked state, i.e. when the locking device 8 secured to the seat back 4 is locked on the anchor member 9 which is fixed to the bodywork 6 of the vehicle. This anchor member 9 may, for example, be in the form of an anchor peg having one of its ends fixed directly to the bodywork 6 of the vehicle.

As can be seen in greater detail in FIGS. 3 to 7, the locking device 8 fitted to the rigid structure of the seat back 4 comprises:

a plate 10 (shown in detail in FIG. 4) in the form of a metal plate which extends vertically between a top portion 10a and a bottom portion 10b, and longitudinally between a first longitudinal edge 10c and a second longitudinal edge 10d which is extended perpendicularly by a flange 11 for fixing to the rigid structure of the seat back 4; this plate 10 also has a cylindrical pin 12 in its middle portion, and in its bottom portion 10b it has a finger 13 which extends downwards together with first and second projecting portions 14a and 14b disposed longitudinally on either side of the finger 13, the plate 10 also including a recess 15 which opens out into the second side edge 10d of the plate 10;

a latch 15 (shown in detail in FIG. 5) directly mounted to pivot on the plate 10 by means of a through hole 15a which surrounds the cylindrical pin 12 of the plate 10; this latch 15 includes a notch 16 for co-operating with the anchor peg 9 fixed to the bodywork, said notch 16 being defined by a first side edge 16a, and by a second side edge 16b which extends beyond the opening 16c of the notch 16 so as to co-operate with the anchor peg 9 by making contact therewith as described below; the bottom portion of the latch 15 also includes a finger 17 and a projecting portion 18; and a control member 19 (shown in detail in FIGS. 6 and 7) that can be actuated by a user and that comprises a first flange 20 which extends vertically and substantially parallel to the plate 10, and also a second flange 21 which extends perpendicularly to the first flange 20; the first flange 20 has a substantially oblong window 20a for fitting around the cylindrical pin 12 of the plate 10 so that the control member 19 can be actuated by a user in a rectilinear direction which, in the example described herein, coincides with the vertical direction passing through the pivot axis 12 of the latch 15; furthermore, the second flange 21 includes a housing 22 for permanently receiving the finger 13 of the plate 10 and also the finger 17 of the latch 15 when the latch is in its locked position as shown in FIG. 1; furthermore, the second flange 21 is defined longitudinally by a first edge 21a and by a second edge 21b which are designed to be placed in register with and in the vicinity of the first and second projecting portions 14a, 14b respectively of the plate 10 when the locking system 7 is in the locked position, as shown in FIG. 3.

With the various component elements of the locking device 8 of the locking system 7 described above with reference to FIGS. 3 to 7, the operating principle of the locking system 7 as a whole is described below with reference to FIGS. 3, 8, and 9.

FIG. 3 shows the locking system 7 in the locked state, i.e. when the seat back 4 is in the raised, in-use position (see FIG. 1). In this locked state, the anchor peg 9 fixed to the bodywork 6 of the vehicle is directly received in the notch 16 of the latch 15, while said latch 15 is prevented from pivoting by means of the control member 19 and the plate 10. More precisely, and as can be seen in FIG. 3, in this locked state, the control member 19 is in a high position such that the finger 13 of the plate 10 and also the finger 17 of the latch 15 are directly received in the housing 22 of the flange 21 of the control member 19. Furthermore, the edge 21a of the flange 21 of the control member 19 is disposed in register with and in the vicinity of the first projecting portion 14a of the plate 10 and also the projecting portion 18 of the latch 15, while the second edge 21b of the same flange 21 of the control member 19 is disposed in register with and in the vicinity of the projecting portion 14b of the plate 10.

Thus, when the seat back 4 is subjected to a rear impact, for example, as symbolized by arrow F2 (FIG. 3) e.g. caused by baggage or any other object disposed behind the seat back 4 that might be propelled towards the seat back 4 following breaking or an impact against the vehicle, the anchor peg 9 tends to cause the latch 15 to pivot in the counterclockwise direction so that the projecting portion 18 and the finger 17 of the latch 15 come into abutment contact respectively against the side edge 21a and the housing 22 of the control member 19, which in turn reacts by coming into abutment contact against the finger 13 and the second projecting portion 14b of the plate 10. Similarly, when the seat back 4 is subjected to a front impact as symbolized by arrow F3 (see FIG. 3), which might be caused by the inertia of an occupant of the back seat 1 following a rear impact on the vehicle, the anchor peg 9 tends to cause the latch 15 to pivot clockwise so that the finger 17 of said latch 15 comes into abutment contact against the housing 22 of the control member 19 so that the first edge 21a of the second flange 21 of said control member 19 reacts by coming into abutment contact against the projecting portion 14a of the plate 10.

Naturally, the plate 10 which is directly fixed to the rigid structure of the seat back 4 and on which the latch 15 and the control member 19 are fitted, itself possesses mechanical characteristics that are suitable for withstanding all of the forces to which the latch 15 is subjected in the event of the vehicle suffering a front or rear impact.

When a user seeks to fold the seat back 4 of the back seat 1 down forwards, the user must manually unlock the locking system 7.

Figure 9:
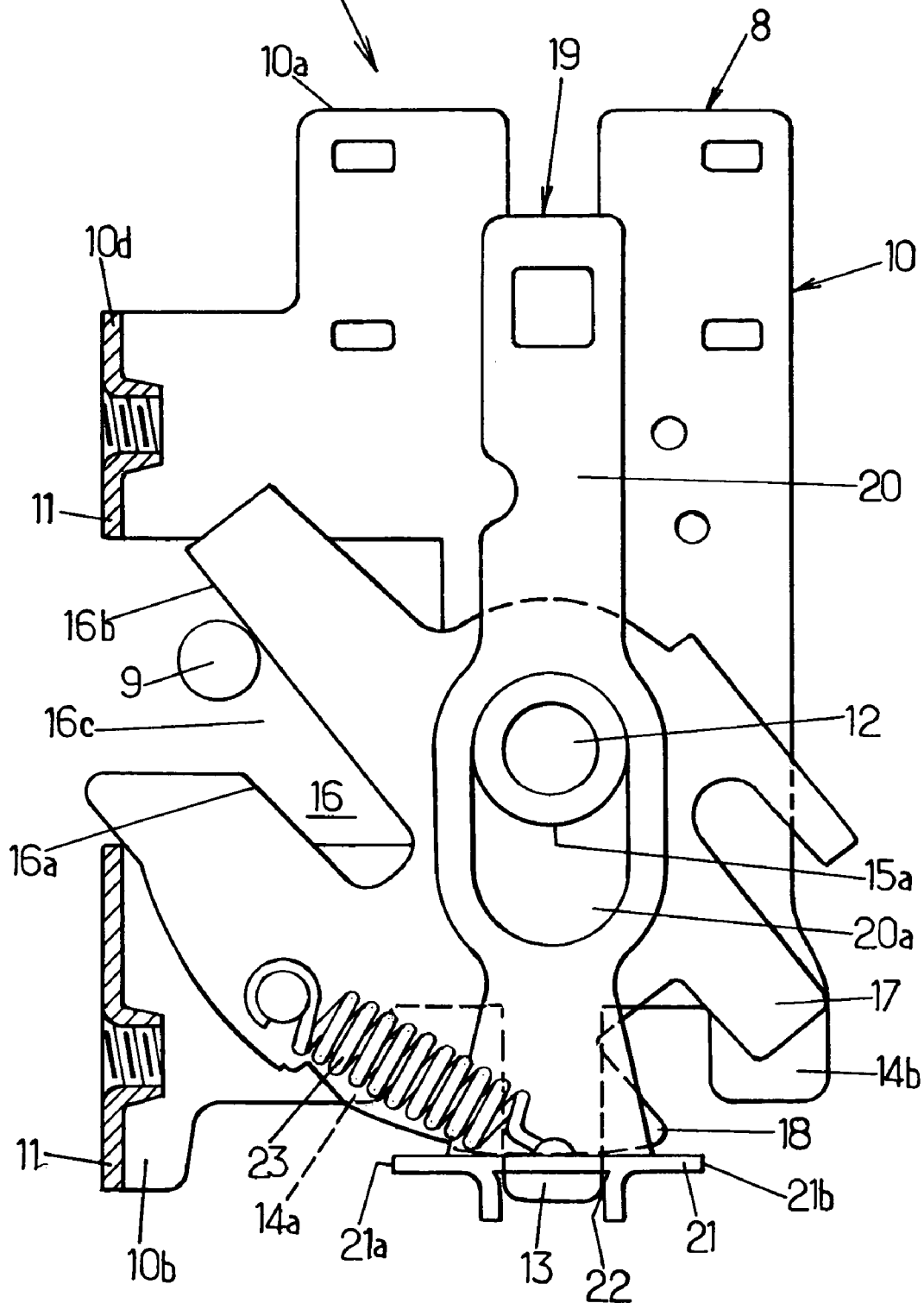
FIG. 9 is an elevation view of the locking system in accordance with the invention, in the unlocked position.

For this purpose, the user acts directly on the control member 19, pushing it downwards in a rectilinear direction as shown in FIG. 8 which shows the locking system 7 in an intermediate position between its locked position (FIG. 3) and its unlocked position (FIG. 9). When the user actuates the control member 19 in a downward direction, the oblong window 20a of the first flange 20 slides on the pivot pin of the plate 10, and the housing 22 of the second flange 21 of the control member 19 also moves downwards. The pin 12 on which the latch 15 pivots also acts to guide the control member during its rectilinear displacement. The locking device 8 includes an elastically deformable element 23 which may be in the form of a compression spring connecting the control member 19 to the latch 15. More precisely, this compression spring 23 extends between a first end 23a which is directly fixed to the latch 15 and an end 23b which is fixed to the second flange 21 of the control member 19. This compression spring 23 is advantageously disposed diagonally relative to the vertical in such a manner that the change in its length between its two ends 23a, 23b is smaller than the displacement of the control member 19. The compression spring 23 becomes tensioned as the control member 19 is moves downwards.

As a result, and as can be seen in FIG. 8, the configuration of the locking system as described above also improves user comfort in the sense that the user need only deliver a small amount of force to make the control member move from its locking position towards its unlocking position (FIG. 9).

When causing the control member 19 to move into its unlocking position, the user delivers a reduced amount of force because:
  the vertical distance between the anchor member 9 and the pivot pin 12 is quite small, leading to a relatively small amount of torque on the latch 15; since the lever arm symbolized by this vertical distance is relatively short, friction forces between the control member 19 and the latch 15 also remain small, even in the event of the anchor member 9 exerting high levels of force against said latch;
  the vertical distance between the pivot pin 12 and the flange 21 of the control member 19 remains sufficiently large, thus making it possible to conserve a large latch-retaining distance for the control member 19 during displacement in the vertical direction of said control member 19; and the change in the length of the spring 23 is less than the total displacement of the control member 19.

As can be seen in FIG. 9, when the user continues to move the control member 19 downwards, the finger 17 of the latch 15 and its projecting portion 18 disengage respectively from the housing 22 and from the edge 21a of the second flange 21 of said control member 19. In this configuration, the latch 15 is merely held in position as shown in FIG. 8 by the side edge 16b of the notch 16 being in abutment contact against the anchor peg 9. The user then need only cause the seat back 4 to pivot forwards so that as the seat back 4 pivots about its own pivot axis 5, the latch 15 pivots about the pivot pin 12 under drive from the spring 23. When the latch 15 comes into abutment contact against the flange 11 of the plate 10, the latch 15 is prevented from turning while the compression spring 23 holds the control member 19 in the unlocking position as shown in FIG. 9. In this configuration, the finger 13 of the plate 10 remains received in the housing 22 of the second flange 21 of the control member 19, such that the control member 19 cannot pivot.

Conversely, when the user returns the seat back 4 to its raised, in-use position, it is necessary firstly to cause the seat back 4 to pivot rearwards so that the side edge 16b of the notch 16 comes into contact with the anchor peg 9 that is secured to the vehicle bodywork 6. In this configuration, the locking system 7 as a whole is again in a position as shown in FIG. 9. When the user continues to cause the seat back 4 to pivot rearwards, the anchor peg 9 causes the latch 15 to pivot clockwise, thus progressively putting the compression spring 23 under tension. When the finger 17 of the latch 15 comes into register with the housing 22 in the control member 19, the compression spring 23 then raises the control member 19 so that its housing 22 becomes engages around the finger 17 of the latch 15, thereby returning the locking system as a whole into a position as shown in FIG. 3, thus causing the entire locking system 7 to lock automatically.

In the above description, the latch 15 and the control member 19 are fitted to the plate 10. Naturally, the plate 10 could be replaced by a support comprising two mutually symmetrical plates 10 connected together, e.g. via a single side flange 11, the control member 19 and the latch 15 then being disposed between the two symmetrical plates 10 so as to reinforce the strength of the locking system 7 as a whole.

What is claimed is:

1. A locking system comprising:
  at least one plate designed to be fixed to a first element;
  a latch including a notch designed to co-operate with an anchor member of a second element, the latch being mounted on the plate to pivot about a pivot pin between firstly a locked position in which the notch is designed to co-operate with the anchor member, and secondly an unlocked position; and
  a control member mounted to move on the plate between firstly a locking position in which the control member prevents the latch from pivoting while it is in the locked position so as to lock the first element with the second element, and secondly an unlocking position in which said control member allows the latch to pivot about the pivot pin towards the unlocked position;
  wherein the control member is mounted to move on the plate in a direction that is substantially rectilinear and perpendicular to the pivot pin of the latch and wherein the control member includes a housing in which a finger of the latch is designed to be held captive while said latch is in the locked position, thereby preventing the latch from pivoting about the pivot pin, the finger of the latch being designed to be disengaged from the housing of the control member when the control member is moved towards the unlocking position, and wherein the plate includes a finger which remains received inside the housing made in the control member so as to prevent the control member from pivoting while it is being displaced in the rectilinear direction between the locking and unlocking positions.

2. A locking system according to claim 1, in which the control member presents a window of oblong shape in which the pivot pin of the latch is received, said pivot pin constituting a pin for guiding rectilinear displacement of the control member.

3. A locking system according to claim 1, in which the plate further comprises guide means for guiding the rectilinear displacement of the control member between the locking and unlocking positions.

4. A locking system according to claim 1, in which the notch of the latch presents an edge which extends beyond the opening of said notch to co-operate by contact with the anchor member of the second element, causing said latch to pivot from the unlocked position towards the locked position, while the first and second elements are being moved towards each other.

5. A system according to claim 1, in which the control member and the latch are connected together by an elastically deformable element adapted firstly to bring the control member into the locking position when the latch is in the locked position in which the control member prevents the latch from pivoting, and secondly to bring the latch into the unlocked position and hold it there when the latch is no longer co-operating with the anchor member.

6. A motor vehicle which comprises a locking system according to claim 1, said vehicle further comprising a structure, a seat including a seat back, and an anchor member, the plate being fixed to the seat back which is pivotally mounted relative to the structure of the vehicle between a folded-down position and a raised, in-use position in which the latch is in the locked position and the notch co-operates with the anchor member so that said seat back is locked to the anchor member of the vehicle.

7. A locking system according to claim 1, in which the control member comprises a first flange substantially parallel to the plate and a second flange perpendicular to the first flange, the housing of the control member being made in the second flange.

8. A locking system according to claim 5, in which the second flange of the control member is defined in a longitudinal direction perpendicular to the rectilinear direction, by a first edge for coming into abutment contact against a first projecting portion of the plate during a predetermined impact, and by a second edge designed to come into abutment contact against a second projecting portion of the plate during a predetermined impact in the opposite direction.

* * * * *